US010661721B2

(12) United States Patent
Tyrer

(10) Patent No.: US 10,661,721 B2
(45) Date of Patent: May 26, 2020

(54) BRACKET FOR GOLF CART ACCESSORY

(71) Applicant: Club Pro Manufacturing USA, Inc., Deer Park, NY (US)

(72) Inventor: Stephen E. Tyrer, Deer Park, NY (US)

(73) Assignee: CLUB PRO MANUFACTURING USA, INC., Deer Park, NY (US)

( * ) Notice: Subject to any disclaimer, the term of this patent is extended or adjusted under 35 U.S.C. 154(b) by 0 days.

(21) Appl. No.: 15/878,872

(22) Filed: Jan. 24, 2018

(65) Prior Publication Data
US 2018/0208125 A1   Jul. 26, 2018

Related U.S. Application Data

(60) Provisional application No. 62/450,132, filed on Jan. 25, 2017.

(51) Int. Cl.
*B60R 9/06* (2006.01)
*A63B 57/00* (2015.01)

(52) U.S. Cl.
CPC ............. *B60R 9/06* (2013.01); *A63B 57/00* (2013.01)

(58) Field of Classification Search
CPC .................. B60R 9/06; A63B 57/00
See application file for complete search history.

(56) References Cited

U.S. PATENT DOCUMENTS

| 4,032,242 | A | * | 6/1977 | Morris | F16B 12/46 |
| | | | | | 248/188 |
| 5,620,125 | A | * | 4/1997 | Duncan | A63B 55/60 |
| | | | | | 224/515 |
| 7,585,010 | B2 | * | 9/2009 | Hardy | B60N 2/012 |
| | | | | | 280/DIG. 5 |
| 7,669,828 | B2 | * | 3/2010 | Hardy | B60R 11/00 |
| | | | | | 224/274 |
| 2002/0145095 | A1 | * | 10/2002 | Winkler | A63B 57/00 |
| | | | | | 248/300 |
| 2004/0113397 | A1 | * | 6/2004 | Lecoq | B60N 3/10 |
| | | | | | 280/727 |

\* cited by examiner

*Primary Examiner* — Corey N Skurdal
(74) *Attorney, Agent, or Firm* — Hoffmann & Baron, LLP

(57) ABSTRACT

A mounting bracket for attaching an accessory such as a cooler, sand and seed bucket or a golf equipment washer includes a mounting portion adapted to be mounted to a side wall and/or a front wall of a golf cart bag well. The bracket includes a mounting flange configured to connectably receive the accessory. The bracket may also include a horizontal support provided between the mounting portion and mounting flange. The horizontal support is preferably perpendicular to the mounting flange for supporting a bottom surface of the accessory mounted thereon.

16 Claims, 11 Drawing Sheets

BRACKET FOR GOLF CART ACCESSORY

This application claims priority to U.S. Provisional Application Ser. No. 62/450,132 filed on Jan. 25, 2017, the disclosure of which is incorporated herein in its entirety.

FIELD OF INVENTION

The invention relates to a bracket attachable to a golf cart for mounting an accessory such as a cooler, container, or equipment cleaner on the bracket.

BACKGROUND

Golf course owners commonly offer four-wheel electric golf carts to their customers for transportation during a round of golf. Golf carts have a small, lightweight body for enabling extended use without need of recharging and for minimizing damage of golf course turf. Typically, carts include a small hooded section over the front wheels, an open passenger compartment, and an open storage area between the rear wheels for securing golf club bags. Two or more narrow struts extend up from the body to support a roof panel for sheltering the passengers and their bags.

For added convenience of the golfers, carts are often fitted with various accessories including containers for cold storage of beverages and dry storage of sand and seed mix used for repairing divots. Such containers typically include a box having a means for attachment to the golf cart, a hinged cover for protecting contents from heat or moisture, and a U-shaped handle for carrying while off of the golf cart. Convenient use of the container requires clearance for cover rotation to the fully opened position for access to the contents of the box. Often, however, clearance is inadequate due to proximity with the passenger seat, golf cart framework, golf bag holder, or another accessory. For example, the current model Yamaha golf cart includes an optional cooler that cannot be fully opened due to interference with the frame of an optional club cover accessory.

The challenge of mounting accessory containers within the restricted space and limited framework of a golf cart has been partially addressed by the prior art. Tyrer, in U.S. Pat. No. 6,601,745, teaches a soft-shell cooler for strapping to the front hood of a golf cart. Lecoq, in U.S. Pat. No. 7,066,363, describes a tray for mounting of a cooler to the steering column of a golf cart. While these inventions provide a mounting solution for a beverage cooler, they are not suitable for sand mix which is generally stored in hard-shell containers outside the passenger compartment so they can be used conveniently without sullying the cart. A preferred location for mounting accessory containers is on the side of the cart directly behind the passenger seat. Beverage coolers and sand mix containers can be provided interchangeably at this location and are often designed to fit a common bracket for reducing production cost. Hardy et al., in U.S. Pat. No. 8,356,789 B2 teaches a mounting method in this location where mounting bosses are integrated to the plastic frame directly behind the seat. This method has been used on the Club Car Precedent golf cart. It would be cost prohibitive to employ this method on an existing golf cart design where these features are not provided by the golf cart manufacturer. It is preferable to mount a cooler or sand bucket to rigid framework in the location described above to ensure long-term durability of the mount. This is possible and common practice for the EZ-Go TXT model where a large aluminum frame member is present. There are, however golf cart designs such as the EZ-Go RXV, where framework is not present in this location. One solution to this problem that is commonly employed is to mount the accessory directly to the top surface of the rear fender. This is disadvantageous because the fender is considered to be a cosmetic surface. Mounting an accessory to the fender requires drilling through the surface causing permanent damage. Additionally, the cooler bracket resting on the top surface of the fender could abrade the surface causing further damage. Alternatively, a large bracket could be employed to reach from the existing framework directly adjacent to the seat to the desired cooler mount location, but this would be cost prohibitive, and would occupy too much of the limited space available in this area. Thus, there is a need to provide a compact cost effective bracket to facilitate mounting an accessory in this area without causing damage to cosmetic surfaces.

OBJECTS AND SUMMARY

According to the present invention, an improved bracket for mounting accessories to a golf cart, has a lower area that mounts to the inside surface of the bag well. The bag well is the inboard area on a golf cart behind the rear axle that is used to house golf bags. Although the mounting bracket is attached to the bag well surface, it is of a low profile design so that it does not substantially impede the area where the golf bags reside. The mounting bracket also provides a mounting means for the accessory such as a dove tail. Holes are drilled through the bag well and threaded fasteners are used to couple the bracket to the bag well. The bracket positions the cooler above the cosmetic fender surface and behind the seat. The bag well is typically not considered to be a cosmetic surface. It is molded from black commodity grade polymer and the surface is textured to hide imperfections such as scratches caused by loading and unloading golf bags. If an accessory is mounted to the bag well and subsequently removed, the mounting holes can simply be plugged and therefore hidden. Additionally, the bag well is less visible as it primarily faces inward. It is possible that an accessory could be solely mounted to a side wall of the bag well, but it may be necessary to mount simultaneously to a side wall and a front wall to provide adequate strength to support the weight of an accessory.

Accordingly several objects and advantages of the invention are to provide a mounting bracket which is cost effective, unobtrusive, corrosion resistant and which does not cause permanent damage to cosmetic surfaces of the golf cart. Still further objects and advantages will become apparent from a study of the following description and the accompanying drawings.

BRIEF DESCRIPTION OF THE DRAWINGS

The present invention and the advantages thereof will become understood by reference to the following detailed description when considered in connection with the accompanying drawings.

DETAILED DESCRIPTION

Figure 1:
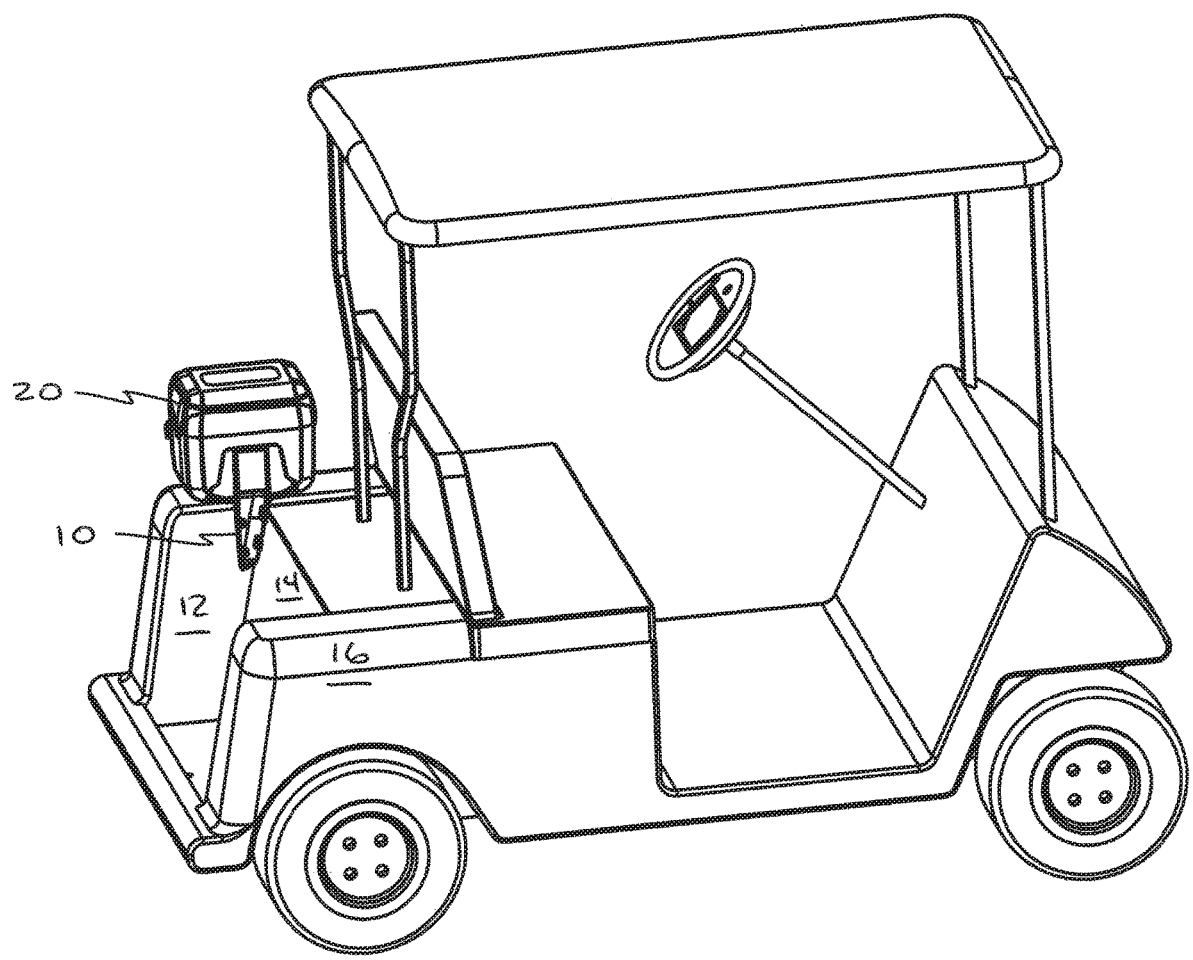
FIG. 1 shows a perspective view of a golf cart with the bracket and accessory mounted thereon formed in accordance with the present invention.
Figure 2:
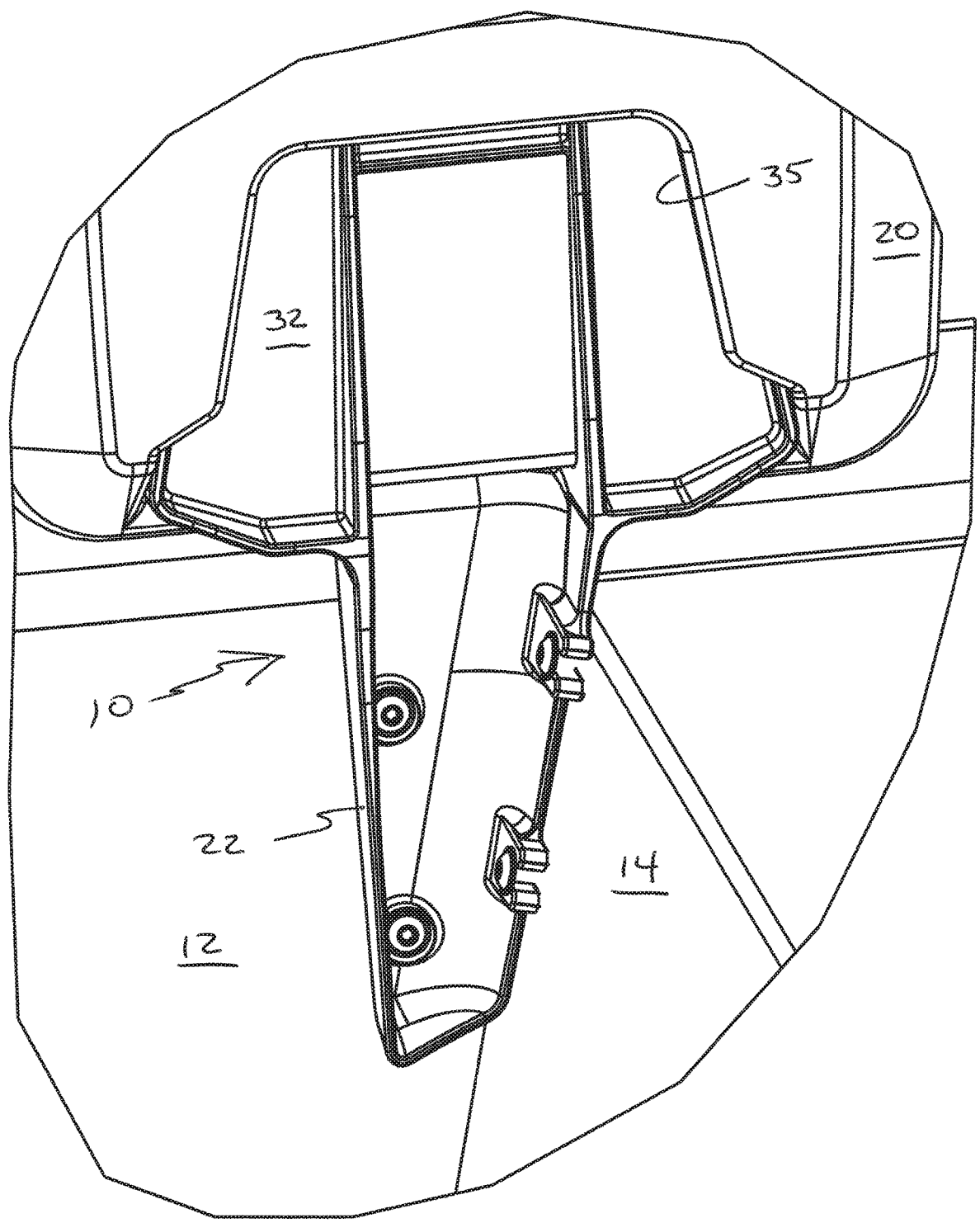
FIG. 2 shows a detailed view of a golf cart with the present invention bracket and accessory installed.
Figure 3:
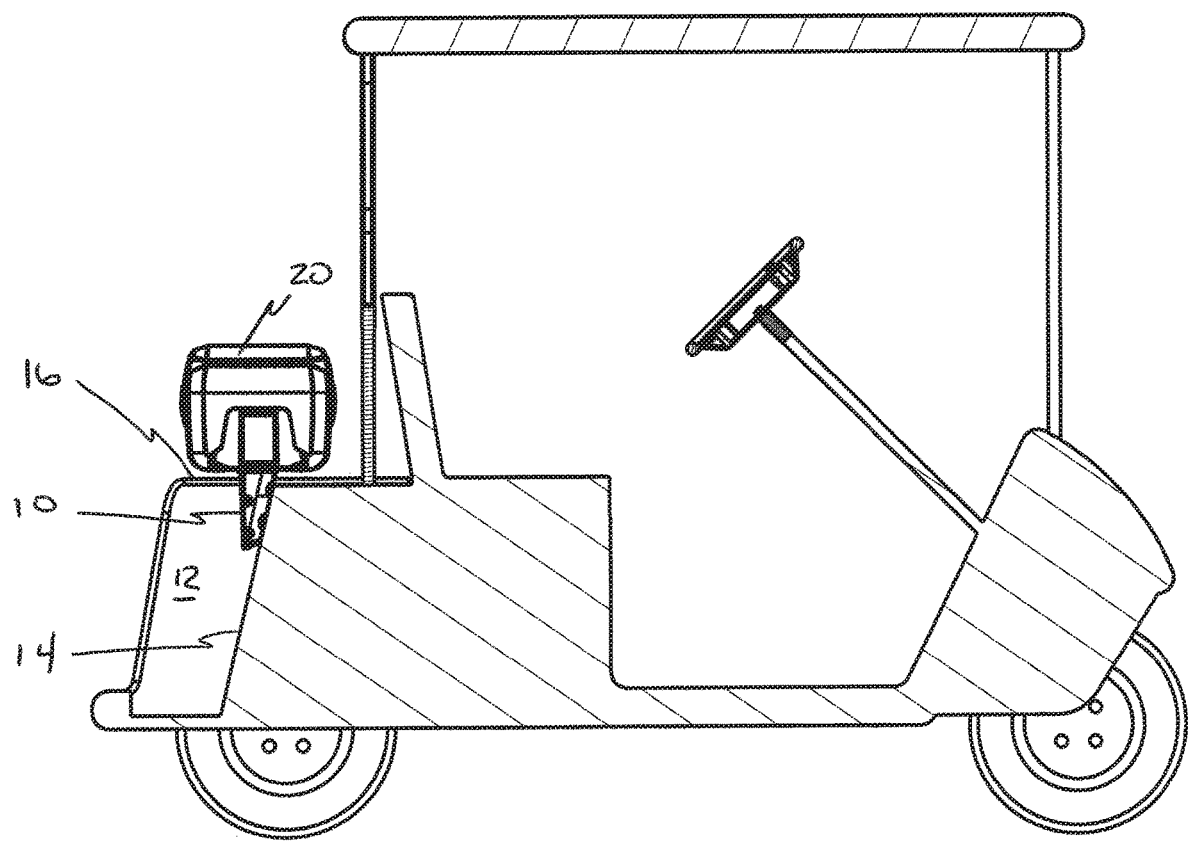
FIG. 3 shows a sectional view of the golf cart with the present invention bracket installed.
Figure 4:
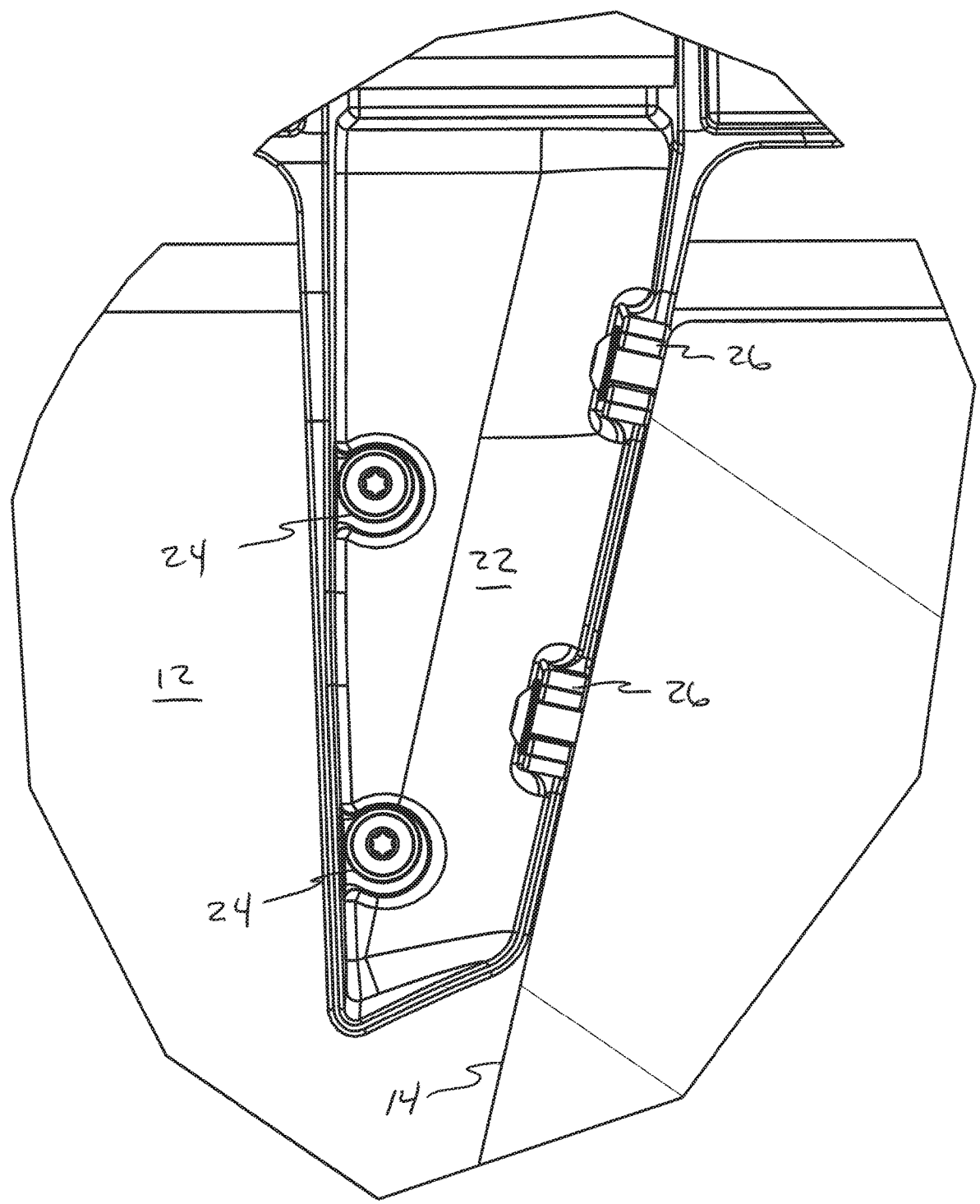
FIG. 4 shows a detailed sectional view of the golf cart with the present invention bracket installed.

Referring now to the drawings in detail, wherein like numbers are used to indicate like elements throughout, there is shown in FIGS. 1 and 3, a mounting bracket 10 that is coupled to a bag well side wall 12 and a bag well front wall 14 which are coupled to a golf cart. The mounting bracket 10 is configured to connectably receive an accessory such as a cooler 20 and position it above a rear fender 16. There is shown in FIGS. 2 and 4 a plurality of fasteners 18 that are used to couple the mounting bracket 10 to the bag well side wall 12 and a bag well front wall 14. However, it is also envisioned that the bracket can be mounted to a single wall, such as a side wall or front wall of a golf car bag well.

Figure 5:
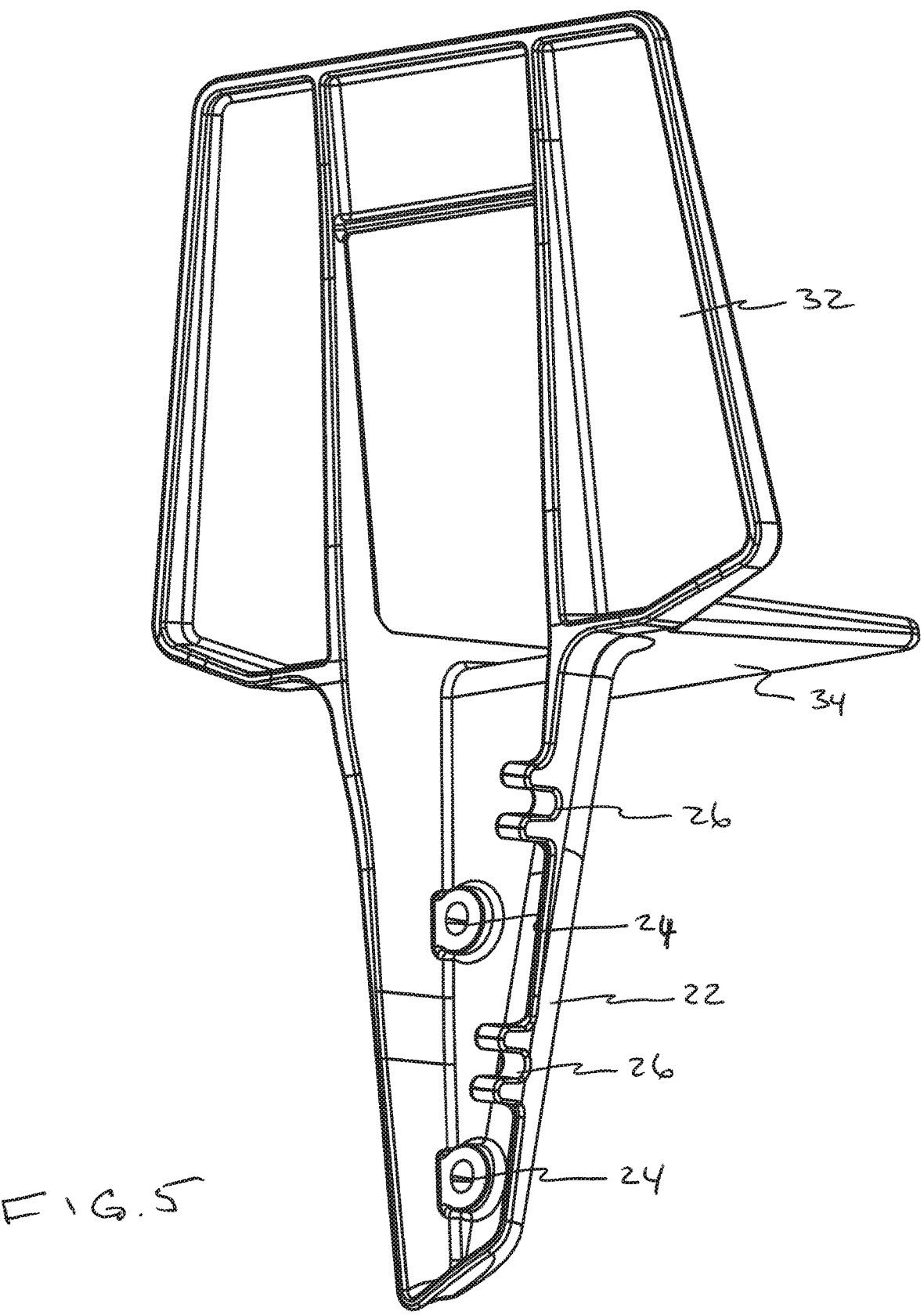
FIG. 5 shows a rear perspective view of the present invention bracket.
Figure 6:
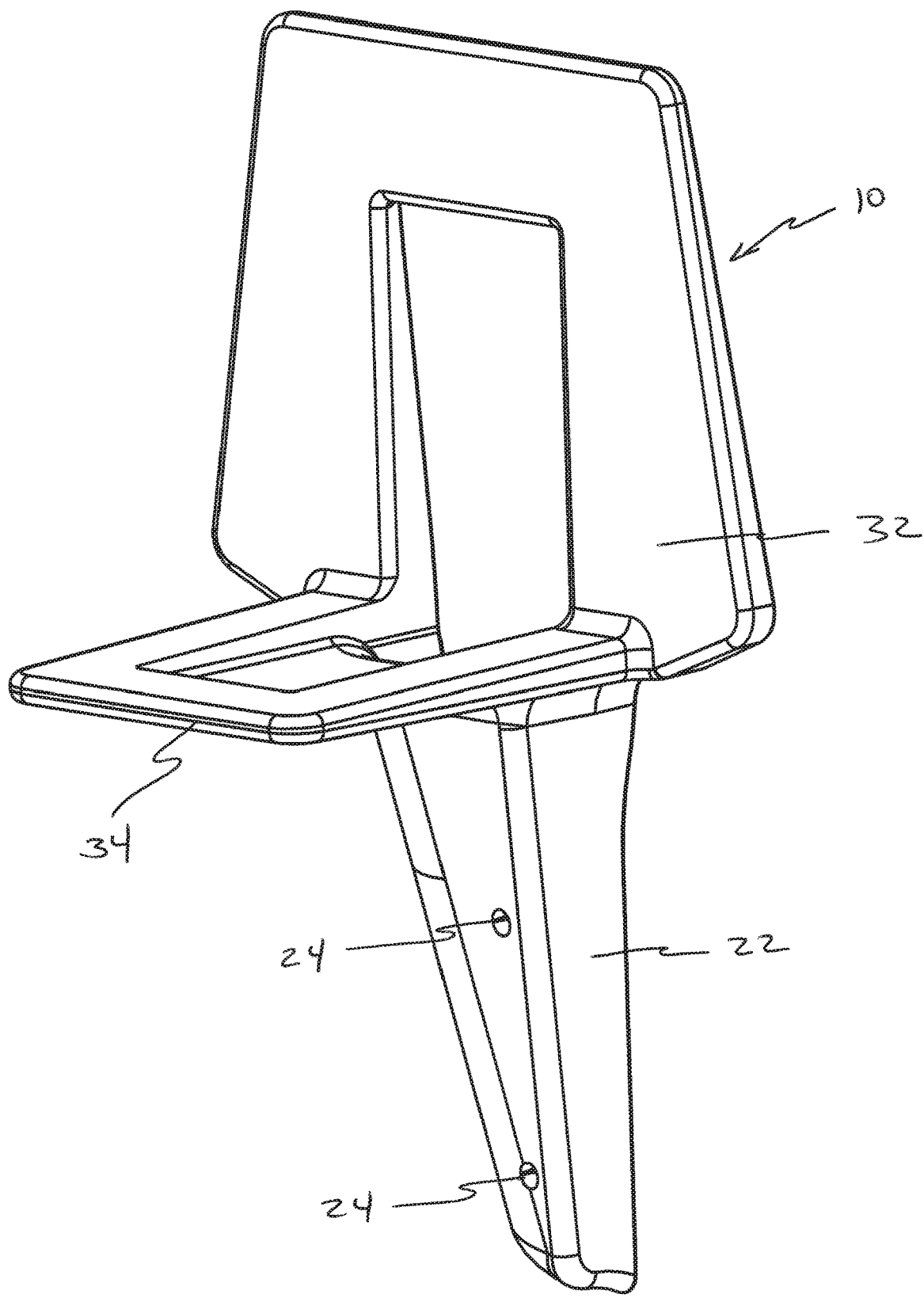
FIG. 6 shows a front perspective view of the present invention bracket.
Figure 7:
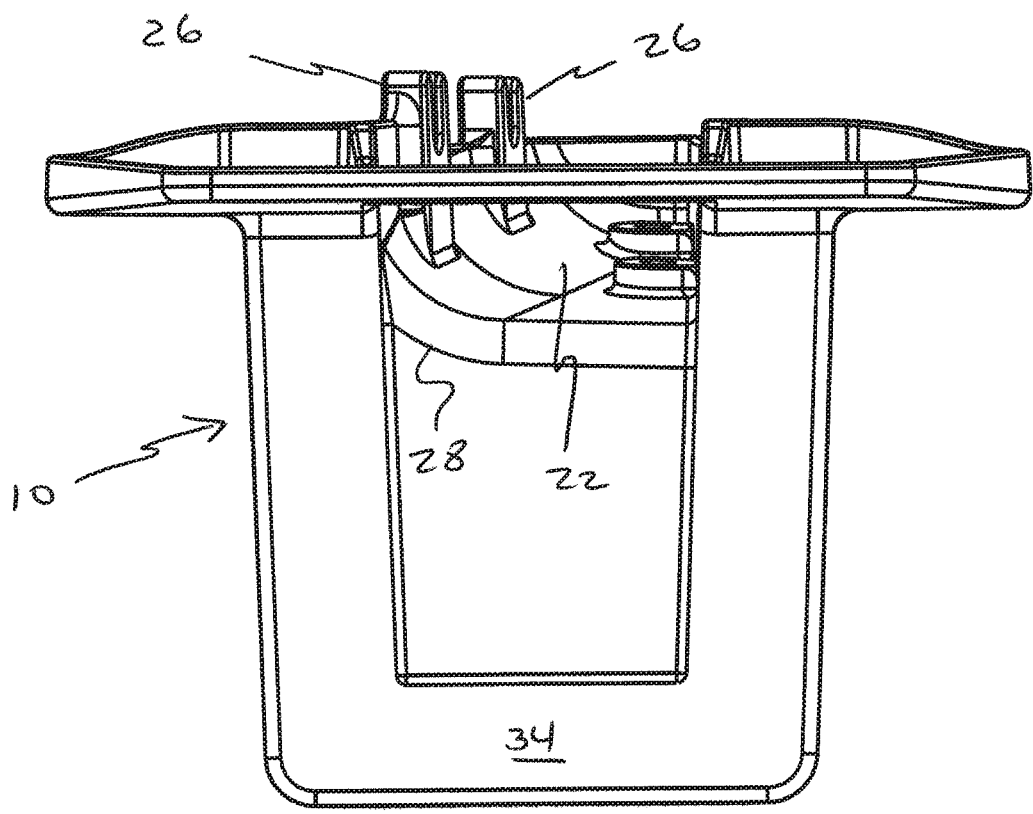
FIG. 7 shows a top plan view of the present invention bracket.
Figure 8:
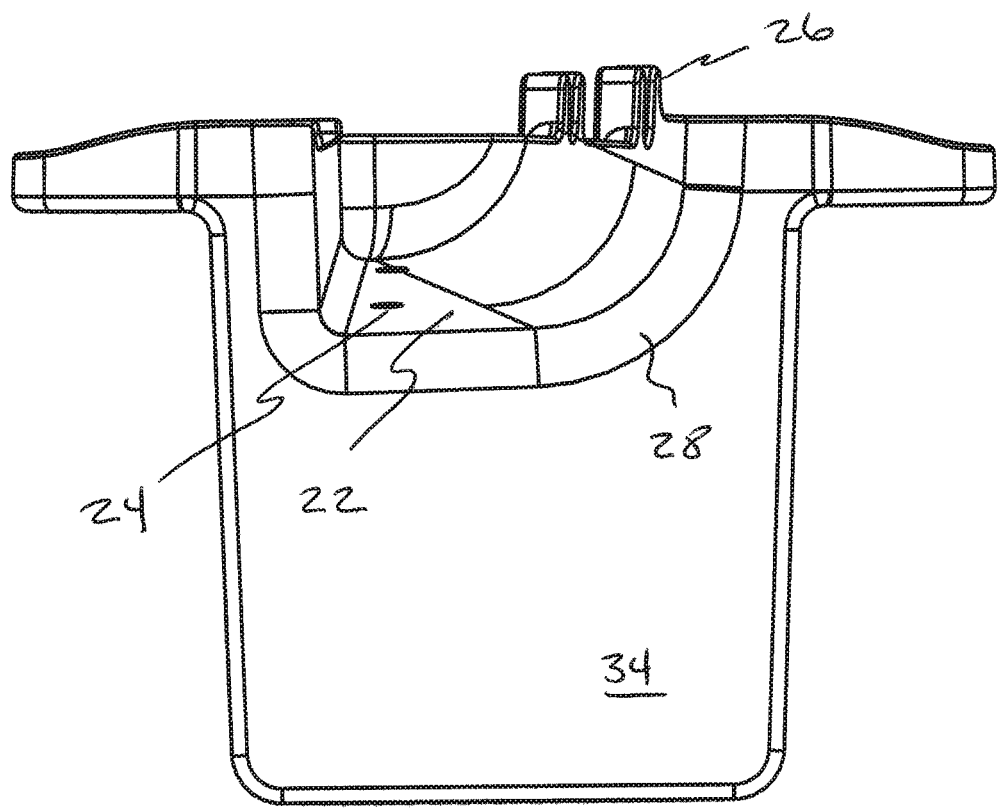
FIG. 8 shows a bottom plan view of the present invention bracket.

FIGS. 2, 4, 5 and 6 illustrate in detail the golf cart accessory bracket 10. As shown in FIGS. 5 and 6, the bracket 10 includes a bottom mounting portion 22 which includes holes 24 and slots 26 adapted to receive fasteners for mounting the bracket to the golf car bag well. The holes 24 are preferably provided along a surface which contacts the bag well side wall 12 while the slots 26 are preferably provided to engage the bag well front wall 14. The bracket holes 24 and slots 26 are designed to permit ease of manufacturing when the bracket is formed by a molding process. The slots 26 permit a fastener to be mounted to a wall and the bracket to be slid onto the fastener. Although holes 24 and slots 26 are shown, those skilled in the art will appreciate that the bracket could include all holes or all slots for the fasteners to mount the bracket to the golf cart. The mounting portion 22 is preferably formed to include a contour which closely follows the contour of the transition from the bag well side wall 12 to the bag well front wall 24. As shown in FIGS. 7 and 8, in one embodiment the mounting portion includes a curved section 28 which fits neatly within a curved corner of the golf cart bag well. In this case, the bracket as shown would be specific to a left or right side mounting. Alternatively, as discussed below with respect to FIGS. 9-11, a universal bracket is adapted to be mounted to either the right or left side.

As shown in FIGS. 5 and 6, the upper portion of the bracket includes a substantially vertical mounting flange 32 having tapered sides to form a dove-tail and, substantially perpendicular to the mounting flange is a horizontal support 34. Once the bracket 10 is securely mounted to the golf cart bag well area, a golf cart accessory may be mounted on the bracket. As shown in FIGS. 1 and 3, a container 20, which may be, e.g., a cooler, sand and seed container and/or an equipment cleaner is removably mounted onto the upper portion 32 of the bracket 10. Preferably, as shown in FIGS. 1, 2 and 3, the accessory includes a back surface having a recess or slot 35 adapted to receive the mounting flange 32. To provide greater support for the accessory which can be heavy (e.g., a cooler filled with beverages and ice), the horizontal support 34 engages and supports a bottom portion of the accessory. In one embodiment, the accessory bottom surface also includes a recess having side walls which conform to the shape of the horizontal support 34 and is adapted to receive the horizontal support 34. This arrangement of both a vertical mounting flange 32 and horizontal support 34 securely mounts the accessory to the golf cart, even when the golf cart is traversing rough terrain.

Figure 9:
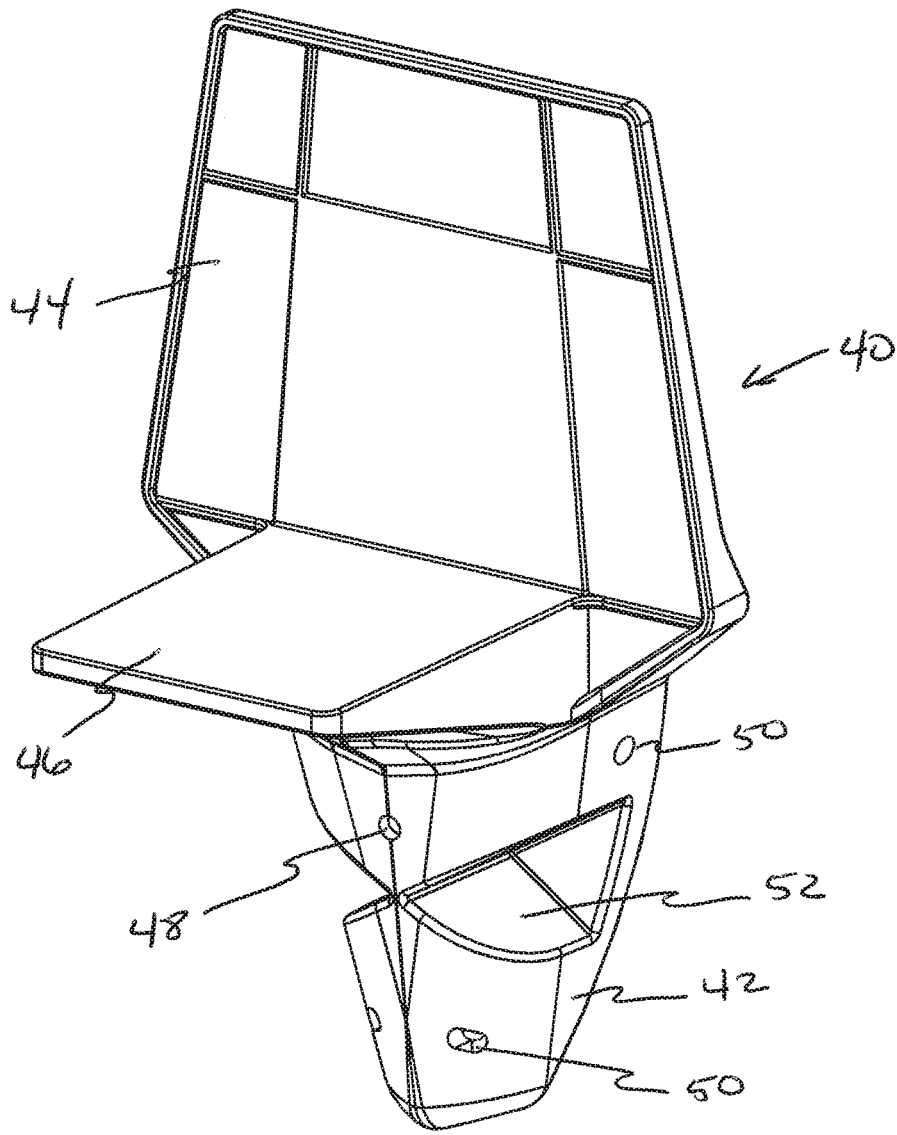
FIG. 9 shows a front perspective view of a universal mounting bracket formed in accordance with the invention.
Figure 10:
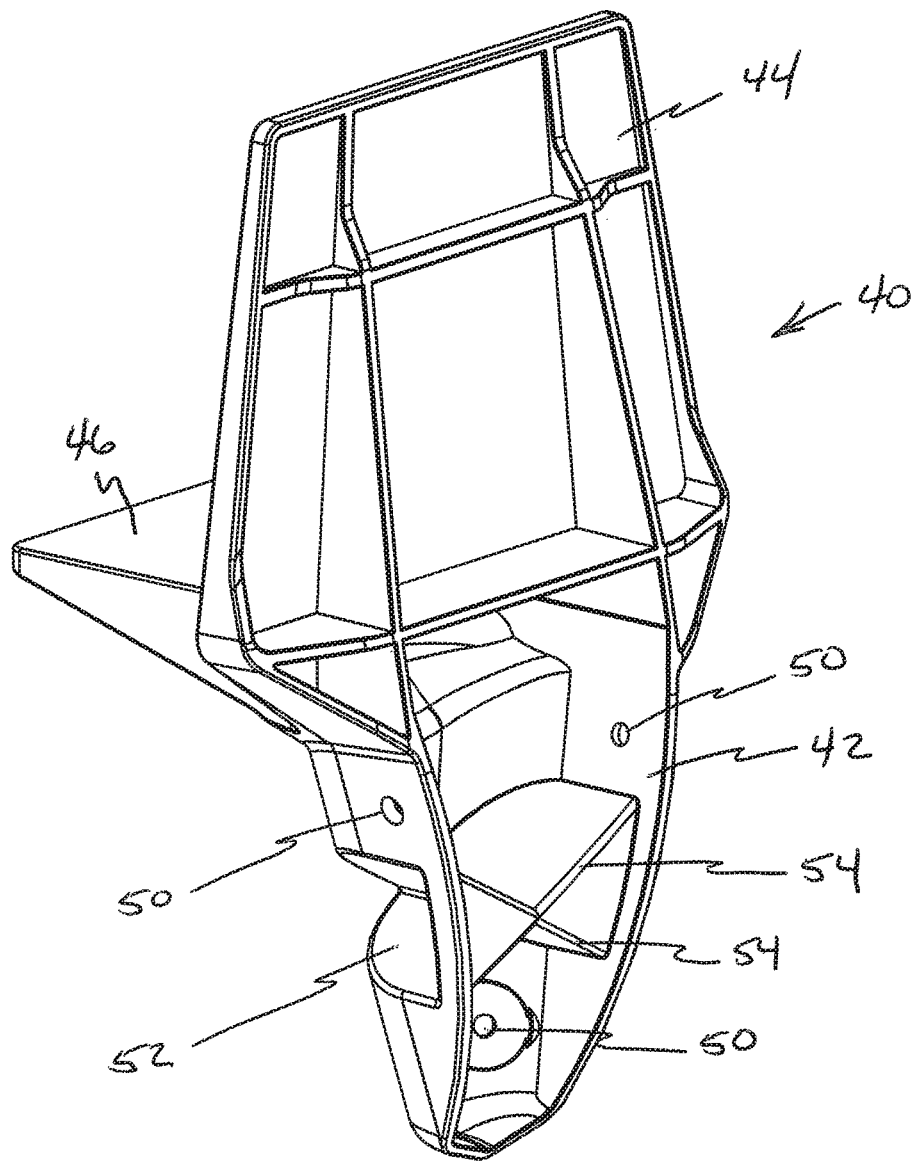
FIG. 10 shows a rear perspective view of the universal mounting bracket shown in FIG. 9.
Figure 11:
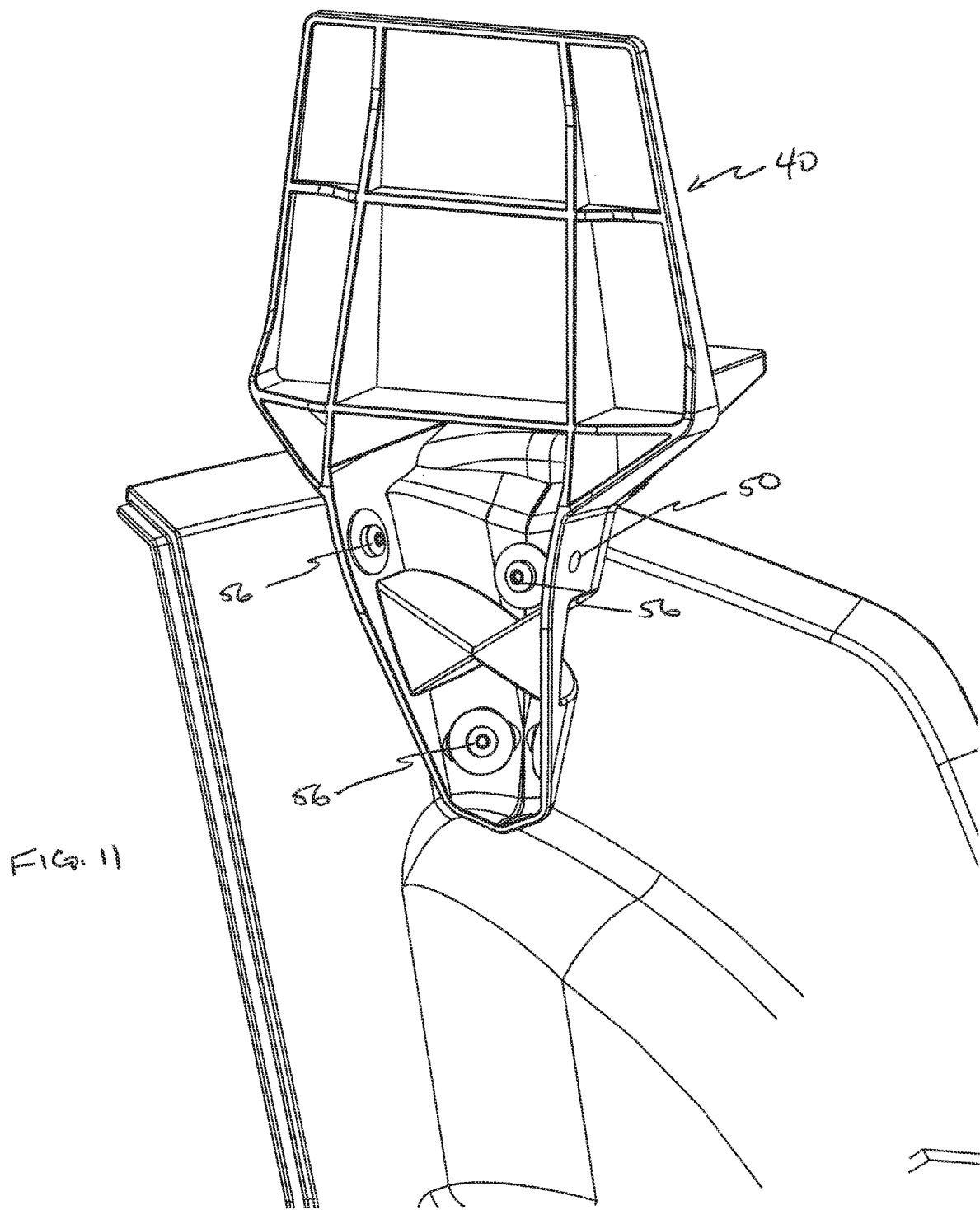
FIG. 11 shows the universal mounting bracket attached to a golf cart bag well side wall and front wall.

Referring to FIGS. 9-11, a universal mounting bracket 40 is illustrated. The bracket 40 includes a mounting portion 42 adapted to be mounted to a golf cart and an upper flange portion 44 adapted to receive a golf cart accessory thereon. The upper portion may also include a horizontal support 46 which is substantially perpendicular to the upper flange 44. Similar to the bracket shown in FIGS. 1-8, the universal bracket 40 may include an upper flange portion 44 which is tapered to form a dovetail. The universal bracket 40 may be mounted to a single wall or to a corner where two walls meet such as a bag well side wall and bag well front wall as shown in FIG. 11.

As shown in FIGS. 9-11, the universal bracket 40 mounting portion 42 includes a plurality of holes dimensioned to receive a fastener such as a threaded screw or any other suitable fastener. Preferably, the mounting portion includes at least five (5) holes including a center hole 48 and four (4) side holes 50. The mounting portion 42 is preferably substantially a rounded v-shaped body wherein the center hole 48 is provided at the apex thereof. Two side holes 50 are provided on each side of the v-shaped body. The mounting portion 42 also preferably includes a pair of notches 52 which, as shown in FIG. 10, form strengthening braces 54 on the mounting portion to provide rigidity to the structure of the mounting bracket 40.

As shown in FIG. 11, the universal mounting bracket 40 may be mounted to either a left or right corner of the golf cart bag well. To mount the universal bracket 40, typically three (3) fasteners 56 will be used; one in the center hole 48 and two fasteners mounted in the side holes 50 on one side of the substantially rounded v-shaped body. Once mounted to the golf cart, an accessory may be mounted to the bracket as described and shown, e.g., with respect to FIGS. 1-3.

The bracket formed in accordance with the present invention may be made of plastic, metal or any other material strong enough to support the golf accessory to be mounted thereon. For example, the bracket may be made of plastic and formed using an injection molding process. If it is desired to make the bracket from metal, the bracket may be formed using a die casting process.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A mounting bracket for attaching an accessory to a golf cart, the bracket including a mounting portion adapted to be mounted to a bag well side wall and further including an upwardly extending mounting flange configured to connectably receive the accessory, and further including a horizontal support provided between the mounting portion and mounting flange, the horizontal support being substantially perpendicular to the mounting flange for supporting a bottom surface of the accessory mounted thereon, said horizontal support having a near end attached to said mounting bracket, and a far end unattached to said mounting bracket, said mounting bracket shaped for attachment to an inside surface of a bag well of said golf cart.

2. The mounting bracket of claim 1, wherein the mounting bracket is made using a die casting process.

3. The mounting bracket of claim 1, wherein the mounting bracket is made using an injection molding process.

4. The mounting bracket of claim 1, wherein the accessory is a cooler having a rear wall with a recess adapted to receive the mounting flange therein.

5. The mounting bracket of claim 1, wherein the accessory is a sand bucket with a recess adapted to receive the mounting flange therein.

6. The mounting bracket of claim 1, wherein the accessory is a golf equipment washer having a rear wall with a recess adapted to receive the mounting flange therein.

7. A mounting bracket for attaching an accessory to a golf cart, the bracket including a mounting portion adapted to be mounted to a bag well side wall and a bag well front wall, the bracket further including an upwardly extending mounting flange configured to connectably receive the accessory, and further including a horizontal support provided between the mounting portion and mounting flange, the horizontal support being substantially perpendicular to the mounting flange for supporting a bottom surface of the accessory mounted thereon, said horizontal support having a near end attached to said mounting bracket, and a far end unattached to said mounting bracket, said mounting bracket shaped for attachment to an inside surface of a bag well of said golf cart.

8. The mounting bracket of claim 7, wherein the accessory is one of a cooler, a sand bucket, or a golf equipment washer, and wherein the accessory includes a rear wall having a recess adapted to receive the mounting flange therein.

9. The mounting bracket of claim 7, wherein the bracket includes mounting holes adapted to receive fasteners.

10. The mounting bracket of claim 9, wherein the bracket further includes mounting slots adapted to receive the fasteners.

11. The mounting bracket of claim 10, wherein the mounting holes are provided on a portion of the bracket attached to either the bag well side wall or front wall and the mounting slots are provided on a wall portion of the bracket not including the mounting holes.

12. The mounting bracket of claim 7, wherein the mounting portion is contoured to closely follow a contour of a transition from the bag well side wall to the bag well front wall.

13. A mounting bracket for attaching an accessory to a golf cart comprising: a mounting portion having a substantially rounded v-shaped body adapted and shaped to be mounted to an inside corner of the golf cart bag well; an upwardly extending mounting flange configured to connectably receive an accessory mounted thereon, said mounting bracket further including a horizontal support provided between the mounting portion and mounting flange, the horizontal support being substantially perpendicular to the mounting flange for supporting a bottom surface of the accessory mounted thereon, said horizontal support having a near end attached to said mounting bracket, and a far end unattached to said mounting bracket.

14. The mounting bracket of claim 13, wherein the accessory is one of a cooler, a sand bucket, or a golf equipment washer, and wherein the accessory includes a rear wall having a recess adapted to receive the mounting flange therein.

15. The mounting bracket of claim 13, wherein the bracket includes at least a center hole adapted to receive a fastener, the center hole being provided at an apex of the rounded v-shaped body and at least one side hole adapted to receive a fastener being provided on each side of the rounded v-shaped body.

16. The mounting bracket of claim 13, wherein the rounded v-shaped body includes a pair of notches forming strengthening braces.

* * * * *